United States Patent [19]

van den Beld

[11] 4,022,500

[45] May 10, 1977

[54] ADHESIVE CONNECTION FOR PLASTIC PIPES

[75] Inventor: Paul Christiaan Herman van den Beld, Hardenberg, Netherlands

[73] Assignee: Wavin B.V., Zwolle, Netherlands

[22] Filed: July 1, 1975

[21] Appl. No.: 592,174

Related U.S. Application Data

[63] Continuation of Ser. No. 464,684, April 26, 1974, abandoned.

[30] Foreign Application Priority Data

Apr. 27, 1973  Netherlands .................... 7305984

[52] U.S. Cl. .................. 285/332; 285/423; 285/DIG. 16
[51] Int. Cl.$^2$ .................................... F16L 25/00
[58] Field of Search ............. 285/332, 334.5, 423, 285/DIG. 16, 390, 374, 284, DIG. 20

[56] References Cited

UNITED STATES PATENTS

| 1,089,650 | 3/1914 | Kile .................... 285/332 X |
| 2,064,679 | 12/1936 | Munroe et al. ........... 285/399 X |
| 2,998,269 | 8/1961 | Houghton ............... 285/423 X |
| 3,345,085 | 10/1967 | Hanes .................. 285/374 X |
| 3,388,932 | 6/1968 | Bradley ................ 285/423 X |

FOREIGN PATENTS OR APPLICATIONS

| 407,723 | 12/1924 | Germany .................... 285/284 |
| 270,349 | 7/1964 | Netherlands ................ 285/332 |
| 360,854 | 4/1962 | Switzerland ................ 285/332 |
| 356,507 | 10/1961 | Switzerland ................ 285/332 |

*Primary Examiner*—Dave W. Arola
*Attorney, Agent, or Firm*—Edmund M. Jaskiewicz

[57] ABSTRACT

A pipe connection for plastic pipes particularly fiber reinforced synthetic pipes made of thermosetting resin, comprising a female pipe part with a widened end of which the inside tapers from the free end and adjoins a longitudinally extending recess in the inner wall of the female pipe, the male pipe part having a protruding part adapted to this recess and having a first end face that on its end adjoins a conical end face which is adapted to the conical shape of the inside of the aforementioned widening, and a glue layer extends from the inside of the pipe connection as far as the outside of the male pipe part. Preferably the protruding part consists of an inner, chemically resistant, layer of a fiber reinforced synthetic resin pipe, which on its outside carries a fiber reinforcement and the inner side of the conical widening has a greater inner circumference which is considerably greater than the outer circumference of the male pipe part.

3 Claims, 1 Drawing Figure

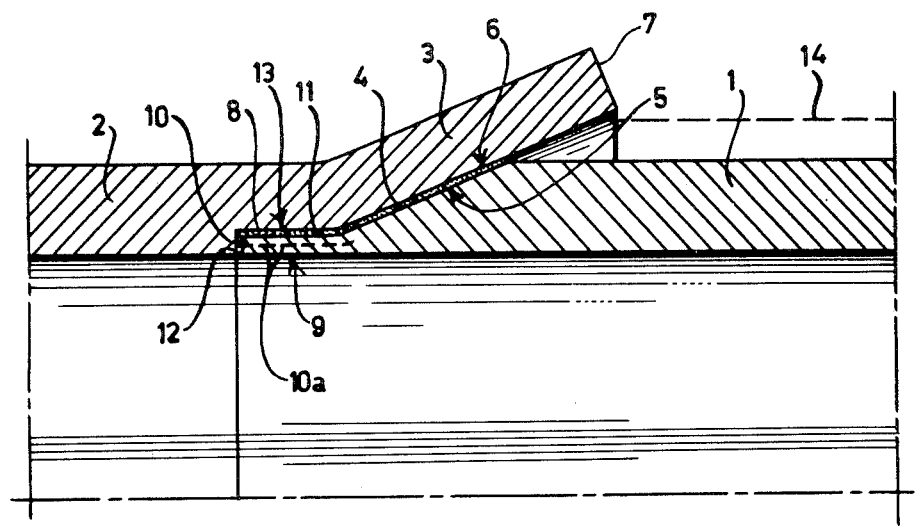

ADHESIVE CONNECTION FOR PLASTIC PIPES

This is a continuation of application Ser. No. 464,684 filed Apr. 26, 1974 now abandoned.

BACKGROUND OF THE INVENTION

The invention relates to a pipe connection for plastics pipes particularly fibre reinforced plastics pipes of thermosetting resin, comprising a male pipe part and a female pipe part with a widened end, an adhesive layer being applied between the end face of the male pipe part and the opposite face of the female pipe part.

Such pipe connections are known in the art. In this known connection a cylindrical key-end of the male pipe part is glued in a cylindrically widened end of a female pipe part. This connection suffers, however, from the disadvantage that it can not universally be used for pipes with an identical inside diameter but a different outside diameter. Glassfibre reinforced pipes of synthetic resin with a particular kind of diameter have an identical inside diameter, but the outside diameter varies in dependence of the pressure requirements imposed. For a higher pressure a greater wall thickness is required whilst maintaining the inside diameter.

Another drawback is in that the liquids to be transmitted through the pipe connection need only cover a rather short way to get at the cut-through fibres of the fibre reinforced plastics pipes, for rather thin adhesive layers are used. It is evident that when the fibres contact the liquid a considerable risk of corrosion may occur. Polyester resins can namely easily hydrolyze when water penetrates, whereby the plastics pipes decompose.

The presence of cut-through fibres in the male pipe parts is connected with the fact that in case of glass fibre reinforced plastics pipes the pipe should be sawed off at the correct length and subsequently, via a socket, be connected with a bend, T-piece or next pipe. It is impossible to manufacture the male parts with the correct length mechanically and as a consequence with a closed end face. By end face is here understood the short-side face of the male pipe part.

SUMMARY OF THE INVENTION

The invention aims to provide a pipe connection of the aforementioned type which does not suffer from these disadvantages.

This is achieved by the arrangement that the inside of the widened end tapers from the free end and adjoins a longitudinally extending recess in the inner wall of the female pipe part, while the male pipe is provided with a protruding part, adapted to this recess, with a first end face which on its outside adjoins a conical end face that is adapted to the conical shape of the inside of the aforementioned, and that the glue layer extends from the inside of the pipe connection as far as the outside of the male pipe part.

By causing the inside of the widened end to taper conically from the free end it is possible to establish a pipe connection while using male pipe parts with the same inside diameter but a different outside diameter and an identical female pipe part. Due to the conical shape of the inside of the widened end, pipes with a different diameter can namely be received in the conically widened end.

Another advantage is in that the aforementioned protruding part which consists of a chemically resistant resin layer, carrying on its outside a fibre reinforcement, contributes to a considerable longer way to be covered by the liquid from the pipe connection before it contacts the conical end face of the male pipe part on which are the cut-through glass fibres. It has been found that in a pipe connection according to the invention the risk of corrosion of such glass fibre reinforced plastics pipes is minimal.

The inside of the conical widening has an inside circumference which is considerably greater than the outer circumference of the male pipe part.

The length of the protruding part is substantially equal to the length of the recess in order to obtain a proper connection of male pipe part and female pipe part.

In the drawing an embodiment is represented.

DESCRIPTION OF A PREFERRED EMBODIMENT

In the FIG. a pipe connection is shown for glass fibre reinforced pipes of thermosetting resin. This pipe connection comprises a male pipe part 1 and a female pipe part 2. The female pipe part 2 is provided with a widened end 3. Moreover there is a glue layer between the front end face 5 of the male pipe part and the opposite inner wall 6 of the widened end 3.

As is shown in the drawing the inside 6 of the widened end 3 tapers from the free end 7 of the female pipe part. Then the wall 6 adjoins a cylindrical recess 8, the latter extending in the longitudinal direction of the female pipe part.

Male pipe part 1 is provided with a protruding part 9 which is likewise cylindrically shaped and has a length which nearly corresponds to the length of the aforementioned cylindrical recess 8 in the female pipe part. This projecting part 9 consists of the chemically resistant layer of glass fibre reinforced synthetic resin pipes with on its outside a glass fibre reinforcement 10a.

This projection can, by means of proper apparatus, be mounted at the end of male pipe part 1.

An adhesive layer 10 and 11 is applied between the end face 12 of the recess and the cylindrical wall 13 of this recess.

The conical shape of the conical end face and of the inside of the widened end are selected such that the total length of the face that is glued, is at least equal to the length of the glued layer required for such a pipe connection.

A proper centration of the male and the female pipe part can be easily effected, since the glue applied is very thixotropic so that the desired centration offers no problems. The thickness of the glue layer should not be too great, since in that case the liquid transmitted through the pipe lines can easily pass through the adhesive layer and penetrate via the cut-through fibres into the resin layer of the pipes. On the other hand the thickness of the adhesive layer should not be too small, since the strength of the adhesive joint would rapidly decrease in that case.

The outside 14 of a male pipe part 1 with the same inside diameter, but a larger outside diameter is indicated by dotted lines. Such a pipe stands for example higher internal pressures. It is obvious that by means of a single female pipe part, male pipe parts of the same inside diameter, but with a notably differing outside diameter can be received in the pipe connection.

The female pipe part is provided with a pre-formed conical widening, so that no cut-through fibres are present.

The protruding part 9 is preferably slightly longer than the recess in order to ensure a glue layer of the desired thickness between the conical face 5, 6 of male pipe part 1 and female pipe part 2. The total length of this cylindrical part 9 is slightly greater than the maximal extent of penetration of the medium to be transmitted by the pipe line into the glue and the one reinforcing layer.

The greatest diameter of the widened end 3 is preferably greater than the outside diameter of the pipe part adjoining the widened part.

What I claim is:

1. Pipe connection for fiber reinforced synthetic plastic pipe made of thermosetting resin comprising a female pipe part with a tapered widened end and a male pipe part, the inside of the widened end tapering conically from the free end thereof to connect to a longitudinally extending cylindrical recess in the inner wall of the female pipe part, the tapered inner surface being a continuation of said cylindrical recess, said male pipe part having an axial protruding part along its inner wall conforming to said cylindrical recess and an outer conical end face extending continuously away from the outer surface of said protruding part and conforming to the conical shape of the inside of said widened end of the female pipe part, the length of the protruding part being greater than the length of the recess, and a glue layer between the conical end face of the male pipe part and the opposite face of the female pipe part and extending from the inside of the pipe connection as far as the outside of the male pipe part to connect said male and female pipe parts, said protruding part consisting of an inner, chemically resistant, layer of a fiber reinforced synthetic resin pipe and the outer face of said protruding part has a fiber reinforcement to reduce seepage of liquid from the inner side of the pipe connection to exposed cut surfaces of fibers on the conical end face of said male pipe part whereby the risk of corrosion to the fiber reinforced pipe is minimized.

2. Pipe connection according to claim 1, wherein the inside of the conical widening has a maximum inner circumference which is considerably greater than the outer circumference which is considerably greater than the outer circumference of the male pipe part such that male pipe parts having the same inner diameter as said female pipe part but greater outer diameter can be accommodated.

3. Pipe connection according to claim 1 wherein the female pipe part consists of one of a glass fiber reinforced polyester resin and epoxy resin.

* * * * *